(12) United States Patent
Wessling et al.

(10) Patent No.: US 9,165,290 B2
(45) Date of Patent: Oct. 20, 2015

(54) SHARING NOTES IN ONLINE MEETINGS

(75) Inventors: Cynthia Wessling, Redmond, WA (US); Thomas Underhill, Seattle, WA (US); Alex Simmons, Seattle, WA (US); Hong Lin, Bellevue, WA (US); Stuti Jain, Kirkland, WA (US); Kitty Chou, Redmond, WA (US); Charles Duze, Sammamish, WA (US); Sirirat Reinikka, Bothell, WA (US); Shruti Kasetty, Redmond, WA (US); Syed Bilal, Bellevue, WA (US); Jeffrey Bell, Seattle, WA (US); David Rasmussen, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 213 days.

(21) Appl. No.: 13/287,914

(22) Filed: Nov. 2, 2011

(65) Prior Publication Data

US 2013/0110925 A1 May 2, 2013

(51) Int. Cl.
*G06F 15/16* (2006.01)
*G06Q 10/10* (2012.01)
*G06F 3/041* (2006.01)

(52) U.S. Cl.
CPC .............. *G06Q 10/109* (2013.01); *G06F 3/041* (2013.01)

(58) Field of Classification Search
CPC ............................. G06F 3/041; G06Q 10/109
USPC ........................................................ 709/204
See application file for complete search history.

(56) References Cited

U.S. PATENT DOCUMENTS

| 6,260,040 B1 * | 7/2001 | Kauffman et al. ................ 1/1 |
| 6,591,300 B1 | 7/2003 | Yurkovic |
| 7,392,484 B1 | 6/2008 | Garfinkel et al. |

(Continued)

FOREIGN PATENT DOCUMENTS

| CN | 101056386 A | 10/2007 |
| CN | 101304326 A | 11/2008 |

(Continued)

OTHER PUBLICATIONS

"Associate with meetings", Retrieved at <<http://www.zoho.com/projects/help/associate-meetings.html>>, Retrieved Date: Sep. 21, 2011, pp. 2.

(Continued)

*Primary Examiner* — Brian J Gillis
*Assistant Examiner* — Juan C Turriate Gastulo
(74) *Attorney, Agent, or Firm* — Steve Crocker; Jim Ross; Micky Minhas

(57) ABSTRACT

Notes may be shared in an online meeting with online meeting attendees through a software application associated with organizing an online meeting, for example, online meeting software, calendaring software, note-taking software, or the like. Notes may be created and/or shared before, during, and/or after the online meeting by meeting attendees. Meeting attendees may be notified when notes are shared for the online meeting. Notes may be shared with items of the software application associated with organizing the online meeting. For example, notes may be shared in online meeting software with the online meeting. Notes may be shared among items of different software applications, for example, notes shared in the online meeting software may be automatically shared with a calendar item in a calendaring software application.

19 Claims, 9 Drawing Sheets

(56) References Cited

U.S. PATENT DOCUMENTS

| | | | |
|---|---|---|---|
| 7,877,460 B1 | 1/2011 | Brouwer et al. | |
| 2002/0103883 A1* | 8/2002 | Haverstock et al. | 709/219 |
| 2003/0189601 A1* | 10/2003 | Ben-Shachar et al. | 345/810 |
| 2003/0208534 A1 | 11/2003 | Carmichael | |
| 2004/0059785 A1* | 3/2004 | Blume | 709/206 |
| 2004/0141005 A1 | 7/2004 | Banatwala et al. | |
| 2004/0168133 A1 | 8/2004 | Wynn et al. | |
| 2005/0114521 A1* | 5/2005 | Lee et al. | 709/228 |
| 2005/0216847 A1* | 9/2005 | Zhu et al. | 715/751 |
| 2006/0265262 A1 | 11/2006 | Kamdar et al. | |
| 2006/0290967 A1* | 12/2006 | Sumitomo et al. | 358/1.14 |
| 2007/0100986 A1* | 5/2007 | Bagley et al. | 709/224 |
| 2007/0112926 A1 | 5/2007 | Brett et al. | |
| 2008/0033957 A1* | 2/2008 | Forstall et al. | 707/9 |
| 2008/0183815 A1* | 7/2008 | Unger | 709/204 |
| 2009/0006982 A1* | 1/2009 | Curtis et al. | 715/753 |
| 2009/0024952 A1 | 1/2009 | Brush et al. | |
| 2010/0131836 A1 | 5/2010 | Dukhon et al. | |
| 2010/0223334 A1* | 9/2010 | Narayanan et al. | 709/205 |
| 2010/0228825 A1 | 9/2010 | Hegde et al. | |
| 2010/0325214 A1* | 12/2010 | Gupta | 709/206 |
| 2011/0099006 A1 | 4/2011 | Sundararaman et al. | |
| 2011/0264745 A1* | 10/2011 | Ferlitsch | 709/205 |

FOREIGN PATENT DOCUMENTS

| | | |
|---|---|---|
| KR | 1020000036285 A | 7/2000 |
| KR | 1020020041357 A | 6/2002 |
| KR | 1020070053539 A | 5/2007 |

OTHER PUBLICATIONS

"SharePoint Integration with Office", Retrieved at <<http://www.alentus.com/hosting/sharepoint-office.asp>>, Retrieved Date: Sep. 21, 2011, pp. 6.

"Get the Latest Noteworthy News", Retrieved at <<http://blog.evernote.com/>>, Retrieved Date: Sep. 21, 2011, pp. 25.

"International Search Report", Mailed Date: Feb. 21, 2013, Application No. PCT/US2012/063136, Filed Date: Nov. 2, 2012, pp. 10.

"First Office Action and Search Report Issued in Chinese Patent Application No. 201210431406.6", Mailed Date: Feb. 28, 2015, 17 Pages.

"Supplementary Search Report Issued in European Patent Application No. 12845660.5", Mailed Date: May 18, 2015, 7 Pages.

Thomas, "Microsoft Office Live Meeting 2007—Handouts and Shared Notes", Published On: Oct. 8, 2007, Available at: https://scissormonkey.wordpress.com/2007/10/08/microsoft-office-live-meeting-2007-handouts-and-shared-notes/.

Rasmussen, David, "OneNote Shared Notebooks—Options and Troubleshooting—Part 1: Windows File Shares", Published On: Dec. 10, 2007, Available at: http://blogs.msdn.com/b/david_rasmussen/archive/2007/12/10/onenote-shared-notebooks-options-and-troubleshooting-part-1-windows-file-shares.aspx.

Locher, L. J., "Troubleshooting with NetMeeting : Systems Management Content from Windows IT Pro", Published On: Jan. 26, 2000, Available at: http://windowsitpro.com/systems-management/troubleshooting-netmeeting.

* cited by examiner

SHARING NOTES IN ONLINE MEETINGS

BACKGROUND

Organizing meetings through a software application is a common experience for computer users. For example, a user may employ a meeting organizer software application to schedule a meeting, completing such tasks as inviting meeting attendees, reserving a conference room, and the like. In another example, a user may be a meeting presenter, and may employ an online meeting organizer software application to conduct an online meeting by online presentation of real-time audio and/or video of the meeting to meeting attendees.

The online meeting presenter may distribute notes before the meeting, e.g., via emailing the notes to meeting attendees or emailing a link to the notes in a location accessible to meeting attendees. Online meeting attendees may similarly provide their own contributions to the notes. However, this may rapidly become inconvenient when distributing notes via email, for example as the number of contributing meeting attendees increases. When the notes are stored in a location accessible to online meeting attendees, they may be accessed by an application providing multiple simultaneous authorship, permitting online meeting attendees to provide their own contributions to the notes. To date, however, such solutions leave the notes separated from the software for conducting or scheduling online meetings.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to sharing notes in an online meeting. Notes may be shared with meeting attendees through a software application associated with organizing an online meeting, for example, online meeting software, calendaring software, note-taking software, or the like. Notes may be created and/or or shared before, during, and/or after the meeting by meeting organizer(s). Meeting attendees may be notified when notes are shared for the meeting. Notes may be shared with items of the software application associated with organizing the online meeting. For example, notes may be shared in online meeting software with the online meeting. Notes may be shared among items of different software applications, for example, notes shared in the online meeting software may be automatically shared with a calendar item in a calendaring software application.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
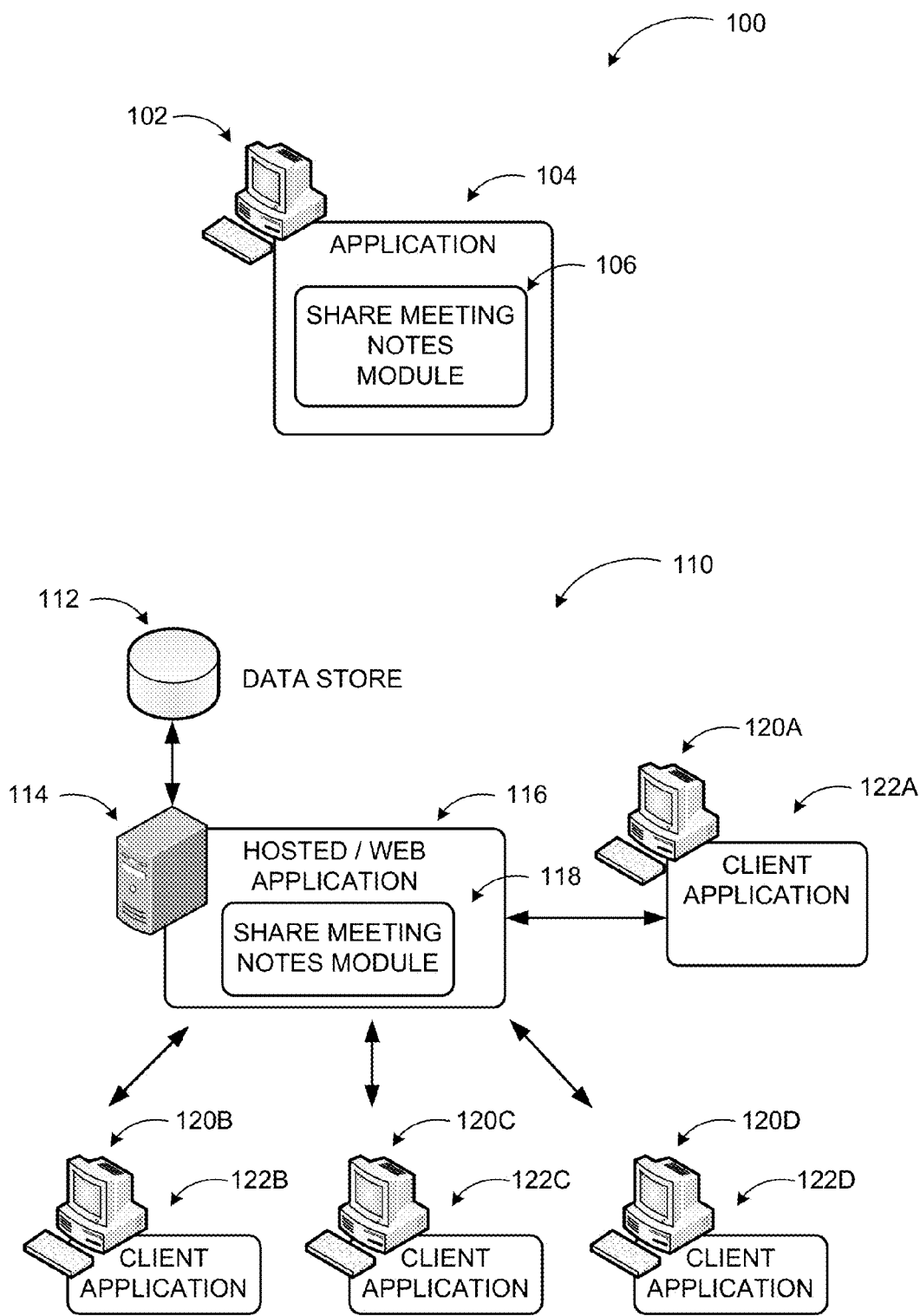
FIG. 1 includes conceptual diagrams illustrating a local and networked environments for sharing online meeting notes, where embodiments may be implemented.

As briefly described above, notes may be shared in an online meeting. Notes may be shared with online meeting attendees through a software application associated with organizing an online meeting, for example, online meeting software, calendaring software, note-taking software, or the like. Notes may also be created and/or or shared before, during, and/or after the online meeting by meeting organizer(s). Meeting attendees may be notified when notes are shared for the online meeting.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for sharing notes for an online meeting. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below. Furthermore, the term "online meeting" refers to any meeting with an online component, where audio, video, application, data, and similar components may be shared over one or more networks between participants. Indeed, in some scenarios, participants may not need to be online during an actual meeting. If the meeting is scheduled online, with notes, and then these notes may be made available to people post-meeting, by interacting with the meetings software.

Referring to FIG. 1, conceptual diagrams 100 and 110 illustrate a local and networked environment, where embodiments may be implemented. The computing devices and computing environments shown in diagram 100 are for illustration purposes. Embodiments may be implemented in various local, networked, and similar computing environments employing a variety of computing devices and systems.

Diagram 100 represents local computing environment in computing device 102, where a software application 104 may enable a user to share notes in an online meeting. Computing device 102 may be any computing device including, but not limited to, desktop computers, laptop computers, servers, handheld computers, vehicle mount computers, smart phones, and comparable devices. Application 104 may be any application useful in conjunction with an online meeting, e.g., software for: conducting an online meeting; scheduling an online meeting; preparing or presenting notes or other materials for the online meeting; and the like. Share meeting notes module 106 may be a separate application or an integrated part of application 104. Application 104 and/or share meeting notes module 106 may control a user interface and provide suitable visual elements for the user to see information associated with available options, make selections, etc.

Diagram 110 illustrates a networked note sharing environment. In the example environment, the note sharing function is provided by hosted/web application 116 and its share meeting notes module 118 executed on server 114. Server 114 may store and retrieve data associated with the online meeting using data store 112. A user may interact with hosted/web application 116 through the user's client application 122A (e.g. a browsing application) executed on computing device 120A. Hosted/web application 116 and share meeting notes module 118 may operate as discussed above. The networked environment may include communications between computing device 120 and server 114 over one or more networks, which may include enterprise networks, cloud-based networks, combinations of those two, and similar ones. Additional client applications may be included, such as 120B, 120C and 120D, executed, respectively on computing devices, e.g., 122B, 122C, and 122D. Hosted/web application and share meeting notes module 118 may thus share notes among users of client applications 120A, 120B, 120C, and 120D. Hosted/web application 116 may also conduct an online meeting, where users of client applications 120A, 120B, 120C, and 120D may also be meeting attendees.

Applications such as 104 and 116 may be any application useful in conjunction with an online meeting, for example, software used to conduct an online meeting, organize an online meeting, prepare materials for an online meeting, and/or present materials for an online meeting.

In some examples, applications such as 104 and 116 may be used to prepare or display text or other media for an online meeting, such as a word processing application, a note taking application, a slide presentation application, a spreadsheet application, a web browser application, an image or video application, or the like. A note-taking application can be a dedicated note taking application, e.g., OneNote® (Microsoft Corporation, Redmond, Wash.), a word processing application, a spreadsheet application, a presentation application, a communication application such as an email application, a text messaging application, or the like.

In some examples, applications such as 104 and 116 may be used to conduct an online meeting, such as a conferencing application, which may be web or server based. A hosted/web application such as 116 may be configured to communicate with client applications such as 120A, 120B, 120C, and 120D. Thus, in some embodiments, server 114 may be configured to facilitate an online meeting and note sharing.

In some examples, applications such as 104 and 116 may be used to organize or schedule an online meeting, such as a calendaring application or an email application. Calendaring or scheduling functionality may be part of a software productivity suite, which may combine communications such as online conferencing with calendar functionality. For example, organizing an online meeting may include one or more of creating a calendar item for the meeting, setting a time for the meeting, scheduling meeting resources such as meeting rooms or online meeting server time, inviting meeting attendees, creating and/or sharing meeting presentation material, creating and/or sharing meeting notes, and the like. Sharing meeting notes is not limited to application 104. Application 104 may enable sharing meeting notes using data from another application or device, or controlling another application or device to share meeting notes.

In some embodiments, a share meeting notes module such as 106 or 118 may provide one or more of: a meeting notes control enabling a user to share notes; detecting activation of a meeting notes control; providing one or more notes for selection; detecting selection of one or more shareable notes; inserting identifier information associated with the online meeting into data of the selected shareable notes; populating a meeting notes page associated with the online meeting with meeting information and the selected shareable notes; sharing the meeting notes page with one or more meeting attendees during the online meeting rendering the selected shareable notes available to the meeting attendees; enabling a user to create a new note; and/or enabling the user to share the new note with the meeting attendees through the meeting notes page.

In other embodiments, the meeting information may include one or more of: a list of anticipated meeting attendees, a list of current meeting attendees, a date and time of the online meeting, one or more locations of the online meeting (physical and/or virtual), a meeting title, a list of one or more shareable meeting notes, and/or a list of meeting content.

In further embodiments, a share meeting notes module such as 106 or 118 may provide sharing the selected notes at one or more of: before the online meeting, during the online meeting, and/or after the online meeting. The share meeting notes module may further provide the meeting notes control within an online meeting application, a note taking application, a word processing application, a presentation application, a calendar application, a communication application, or a spreadsheet application. The module may also provide a persistent link to the shared meeting notes through a record of the online meeting within an online meeting application or a calendar application.

In some cases, the meeting attendees may be notified when shareable notes are available with an ongoing online meeting and be enabled to view the shared notes through the meeting notes page. The shared notes may also be viewed through a web browser, a note taking application, a word processing application, a presentation application, a calendar application, a communication application, or a spreadsheet application. The meeting notes page may be provided through a separate user interface or an integrated user interface associated with the online meeting.

In some embodiments, permission attributes associated with the shared meeting notes may be defined for the meeting attendees and the meeting attendees enabled to access the shared meeting notes based on their permission attributes. Furthermore, a share meeting notes module such as 106 or 118 may automatically determine permission attributes of the meeting attendees associated with the shared meeting notes based on their online meeting roles and enable the meeting attendees to access the shared meeting notes based on their permission attributes.

The example systems in FIG. 1 have been described with specific servers, client devices, applications, modules, and interactions. Embodiments are not limited to systems according to these example configurations. A platform providing a share meeting notes function may be implemented in configurations employing fewer or additional components and performing other tasks. Furthermore, specific protocols and/or interfaces may be implemented in a similar manner using the principles described herein.

Figure 2:
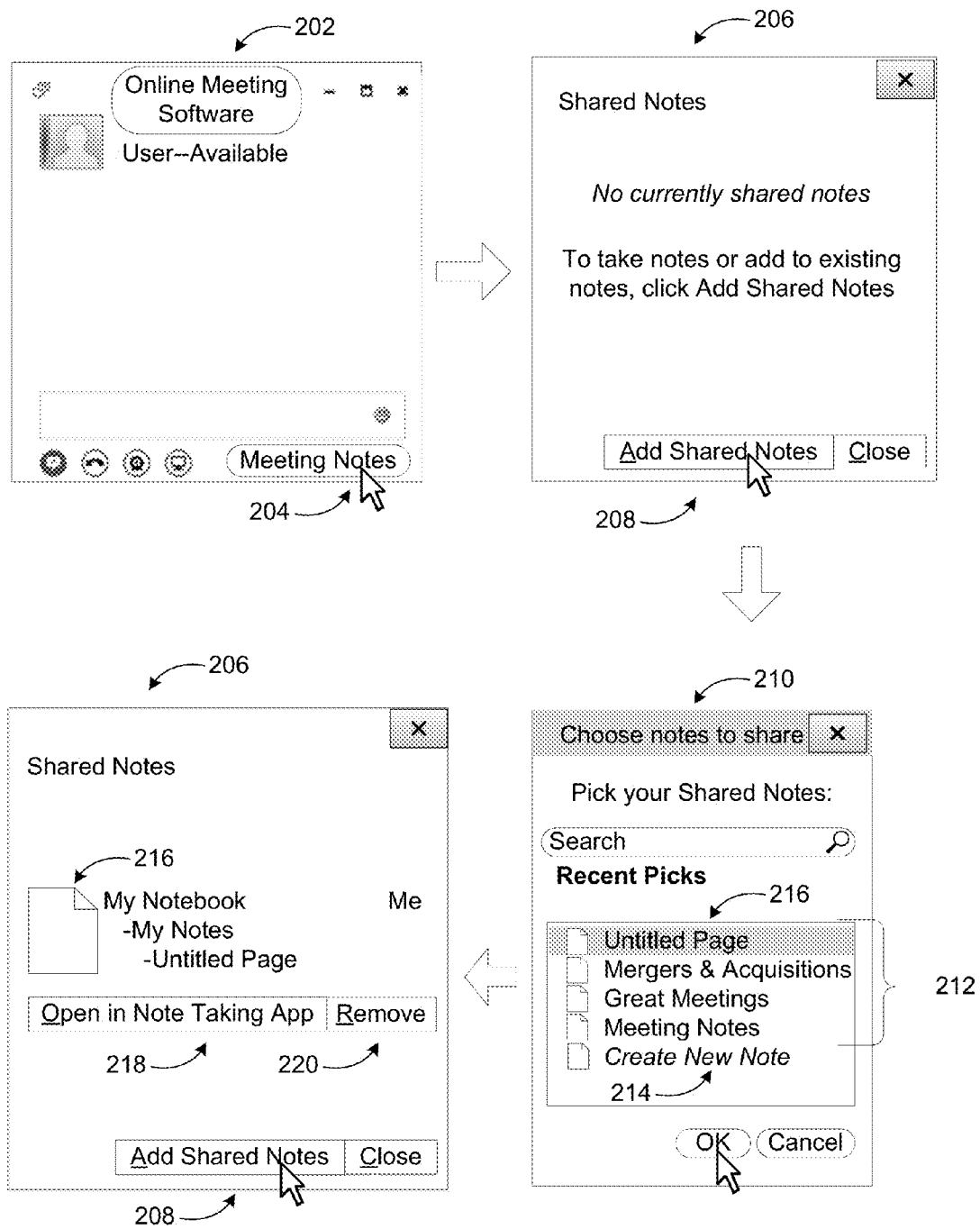
FIG. 2 is a conceptual illustration of screenshots of example user interface elements for sharing meeting notes in combination with an online meeting application, according to some embodiments.

FIG. 2 illustrates an example where a user or meeting attendee may join an online meeting using online meeting application software. Within online meeting application user interface 202, the user may click a button 204 that displays a Meeting Notes page 206 that shows currently shared notes, if any, and permits the user to click an Add Shared Notes button 208. The user may click Add Shared Notes button 208 to display note selection dialog 210, which may include a list of existing shareable notes 212 that may be shared with the meeting. Note selection dialog 210 may also provide the user with an option 214 to create and share new notes with the meeting. The user may select one or more notes 216 to be shared with the meeting and click OK. The Shared Notes dialog may then show the notes 216 now shared with the meeting. Data associating the notes with the meeting may be automatically added to the notes page 216 and the notes 216 may be populated with meeting details. The Meeting Notes page 206 may also include, for example, a button 218 to open the notes 216 for editing and/or a button 220 to remove a note from being shared with the meeting.

Figure 3:
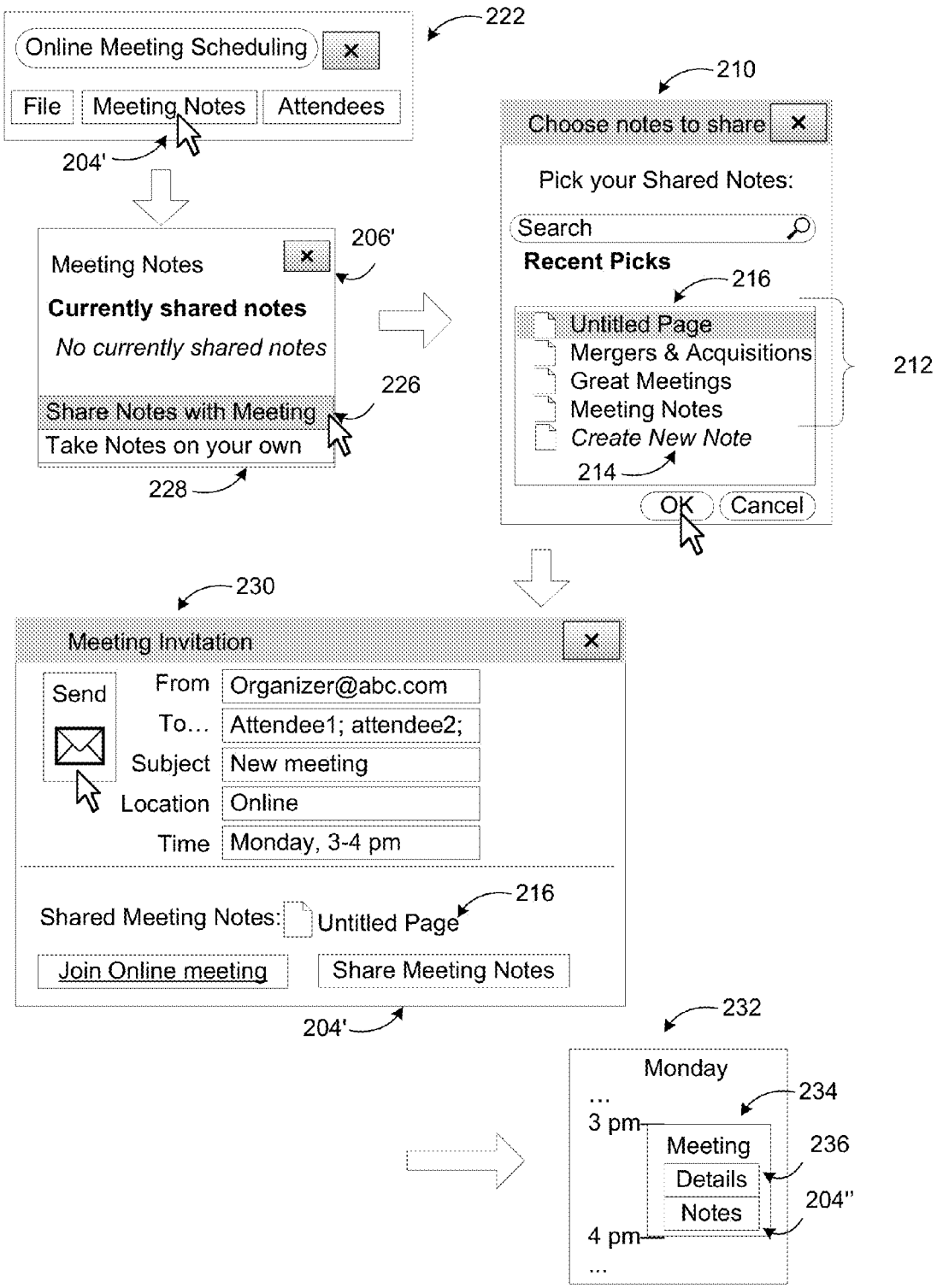
FIG. 3 is a conceptual illustration of further screenshots of example user interface elements for sharing meeting notes in combination with a scheduling program, according to other embodiments.

FIG. 3 illustrates an example of sharing notes from within an online scheduling application 222 for meetings not supported by an online meeting application. When scheduling a meeting in an online scheduling application 222, the meeting organizer may click a button 204' that displays a Meeting Notes page 206' that shows currently shared notes, if any, and permits the organizer to click a Share Notes with Meeting Button 226 or Take Notes on your own button 228. The organizer may click Share Notes with Meeting Button 226 to display note selection dialog 210, which may include a list of existing shareable notes 212 that may be shared with the meeting. Note selection dialog 210 may also provide the user with an option 214 to create and share new notes with the meeting. The user may select one or more notes 216 to be shared with the meeting and click OK. A meeting invitation item 230 may then show the notes 216 now shared with the meeting. Data associating the notes with the meeting may be automatically added to the notes page 216 and the notes may be populated with meeting details. The meeting invitation item may be added to a calendar 232 as a calendar item 234. In addition to data on the meeting notes page, metadata with information about the notes may be added to the meeting invitation 230 so that this information is retained by the meeting invitation item 230 and meeting calendar item 234. In various examples, this information may be used by any scheduling application that can read the data. For example, the meeting calendar item 234 may provide the data or other meeting information, either by displaying such information or by providing a Details button 236 for the user to click. The meeting invitation item 230 and the calendar item 234 may also include respective Meeting Notes buttons 204' and 204" that permit a user to access, share, and/or create meeting notes, e.g., by activating dialog 210. Meeting notes may also be disassociated with a calendar item.

Figure 4A:
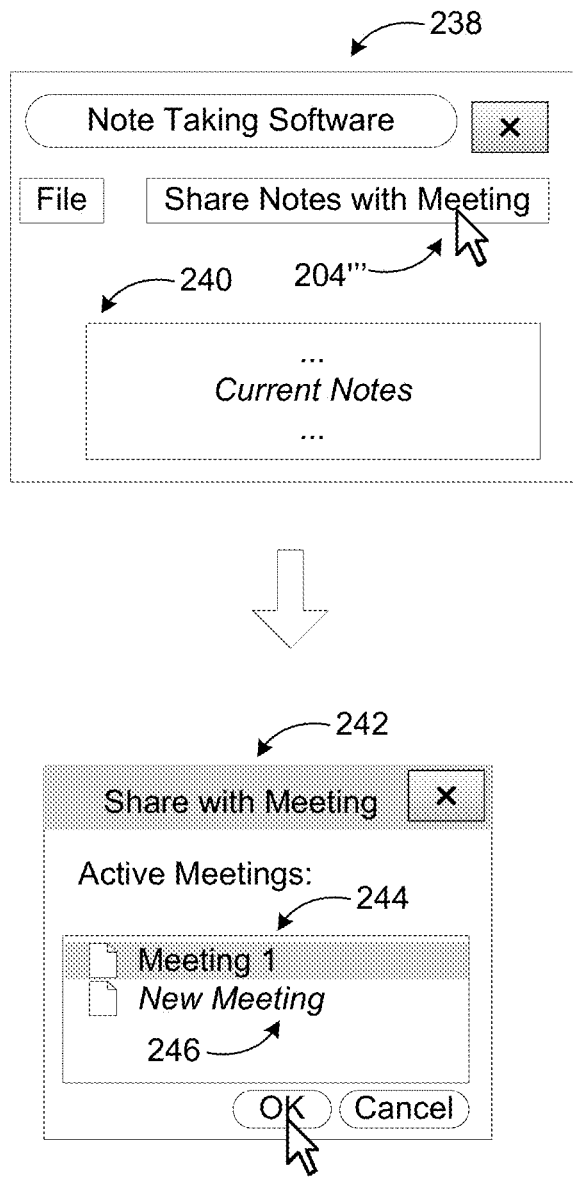
FIG. 4A is a conceptual illustration of further screenshots of example user interface elements for sharing meeting notes in combination with a note-taking program, according to further embodiments.

FIG. 4A illustrates an example of sharing notes from within a note-taking application 238. For example, a user may join an online meeting using online meeting software 200 in FIG. 2. Referring again to FIG. 4A, the user may click a Share Meeting Notes command 204''' from within note-taking application 238 to share the current notes 240. A Share with Meeting dialog 242 may be presented to the user, which may show a list of meetings 244 to which the user is currently joined and/or an option 246 to join or start a new meeting. The user may select, for example the online meeting 242 and click OK, thus sharing the current notes 240 with meeting 242. Data associating the notes with the meeting may be added to the notes page, the notes may be populated with meeting details, and the notes may be shared with the online meeting.

Figure 4B:
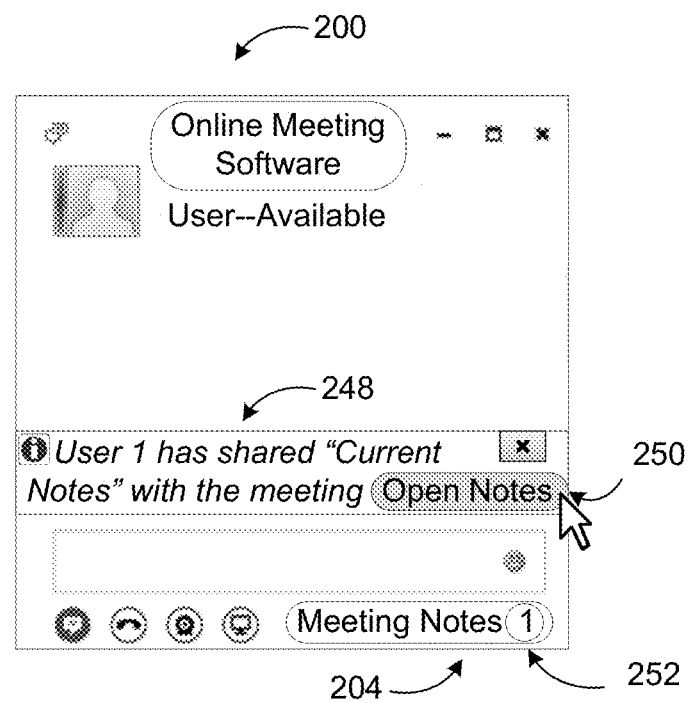
FIG. 4B is a conceptual illustration of further screenshots of example user interface elements for notifying users of shared notes.
Figure 4B:
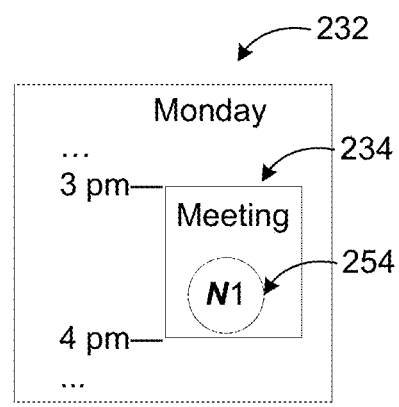

In various examples, meeting attendees may be notified when shared meeting notes are available for a meeting. FIG. 4B illustrates various methods of notifying other meeting attendees may be notified that the meeting has shared notes available, for example when notes may be shared with a meeting using one of the described methods, e.g., those described in FIG. 2, FIG. 3, or FIG. 4A. Depending on the type of meeting software involved, this notification of shared notes may take any suitable form.

For example, FIG. 4B illustrates that when notes may be shared with an online meeting that is held using online meeting software 200, a notification user interface 248 may appear within application 200 that indicates, e.g., "Notes have been shared with this meeting." Attendees may dismiss this notification or may directly open the notes using button 250 from this location.

In another example, FIG. 4B illustrates that when notes may be shared with a meeting via online meeting software 200, an indicator 252 in the user interface may change to show that notes have been shared with the meeting. In various examples, indicator 252 may be persistent. In some examples, indicator 252 may indicate how many shared notes are available.

FIG. 4B also illustrates that when notes have been shared with a scheduled meeting via calendar software application 232, an indicator 254 may be displayed to indicate to users that shared notes have been associated with this meeting. In some examples, indicator 254 may indicate how many shared notes are available. In other embodiments, an online meeting may be an ad hoc meeting without prior scheduling, but notes may be added during the meeting and subsequently tracked in a calendar view of the meeting application.

In various examples, users or meeting attendees may easily access and open shared notes associated with a meeting. The methods described herein provide meeting attendees with the ability to access shared meeting notes within the context of the corresponding meeting and without needing to leave the meeting environment.

In other examples, users of an online meeting may take on one or more roles, such as presenter, organizer, contributor, attendee, and the like. Referring to FIG. 1, according to some embodiments, the user of client application 120A may organize and present the meeting, and may contribute materials such as presentation slides and notes to the online meeting. In this example, the users of client applications 120B, 120C, and 120D may be meeting attendees. In some examples, these various roles may be extended to users based on permissions administered by the note sharing module, which may be controlled by the meeting organizer or meeting presenter. For example, users may be given permission to view shared meeting notes, to create or modify shared meeting notes, to share meeting notes, and the like. Moreover, multiple notes may be created or edited during a meeting, each shared with potentially different and potentially overlapping sets of participants. Sharing for each set of notes may be per-user or per-role and is per set of notes.

Shared meeting notes may also be accessed before, during, or after the meeting. For example, referring to FIG. 4B, when notes may be shared with an online meeting that is held using online meeting software 200, a notification user interface 248 may appear within application 200 that indicates, e.g., "Notes have been shared with this meeting." Meeting attendees may open the notes directly from this notification via button 250. In another example, referring to FIG. 2, online meeting software 200 may be assigned a persistent link 216 in Meeting Notes page 206 to find and open any notes that have been shared with the meeting. In a further example, referring to FIG. 3, when notes have been shared with a scheduled meeting via calendaring software 222, a link 216 to the meeting notes may be automatically put into the invitation 230. In various examples, access to shared meeting notes at various times may be linked to the various user roles described and may be controlled by the described permissions. For example, to facilitate management of shared notes during a busy meeting with many meeting attendees, while each meeting attendee may be given permission to create meeting notes for sharing during the meeting, permission for sharing of notes during the meeting may be controlled or moderated by a user such as the meeting organizer.

In some embodiments, an owner of the meeting may issue an invite that adds shared notes. In other embodiments, any invitee may be enabled to add notes. In the latter case, the owner may be enabled to approve which notes are added. Some meetings may be open and anyone may be allowed to add whatever notes they want. Invitee-added notes may be advertised through a communication or scheduling application similar to owner-added notes. For example, a service may maintain a lookup table that any invitee can write to. When the participants want to add notes, the meeting identifier may be looked up and a new entry added for notes for that meeting. Further embodiments may provide a user experience for a meeting owner to see what participants have tried to add, and approve or reject them. In some examples, invitee-added notes may be auto-approved and the meeting invite may be updated to reflect the addition(s).

The examples in FIG. 2, FIG. 3, FIG. 4A and FIG. 4B have been described with specific user interface elements, configurations, and presentations. Embodiments are not limited to systems or methods according to these example configurations. Sharing of meeting notes may be implemented in configurations using other types of user interface elements, presentations, and configurations in a similar manner using the principles described herein.

For example, the elements of FIG. 2 and FIG. 3 may be combined when employing an online scheduling application 222 in conjunction with an online meeting application 200. In such an example, notes may be shared by the meeting organizer from within the online scheduling application 222 when scheduling the meeting, as described for FIG. 3. Also as described for FIG. 3, the meeting organizer and/or the meeting attendees may share notes through Meeting Invitation item 230 created by the scheduling application 222, e.g., before, during, or after the meeting. Further as described for FIG. 3, the meeting organizer and/or the meeting attendees may share notes through calendar application 232 using Meeting Notes button 204" in Meeting Calendar item 232, e.g., before, during, or after the meeting. Also, as described for FIG. 2, the meeting organizer and/or the meeting attendees may share notes through online meeting application 200 using Meeting Notes button 204 during the online meeting.

Figure 5:
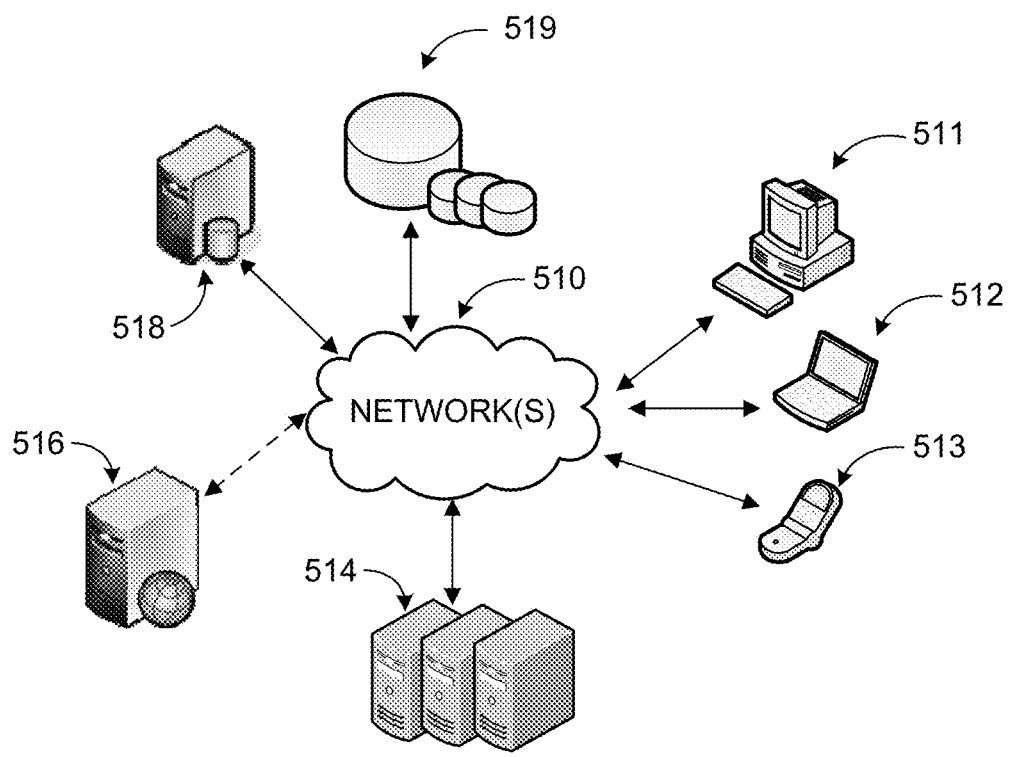
FIG. 5 is a networked environment, where a note sharing system according to embodiments may be implemented.

FIG. 5 is an example networked environment, where embodiments may be implemented. A system for sharing online meeting notes may be implemented via software executed over one or more servers 514 such as a hosted service. The system may employ a peer-to-peer, a web based, or other configurations. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. An application module executed on one of the servers may facilitate sharing online meeting notes. The application module may provide information associated with currently shared notes, shareable but not currently shared notes, the option to create and/or share new notes, and other examples as described herein. The note sharing module may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform providing sharing online meeting notes. Furthermore, the networked environments discussed in FIG. 5 are for illustration purposes only. Embodiments are not limited to the example applications, modules, or processes.

Figure 6:
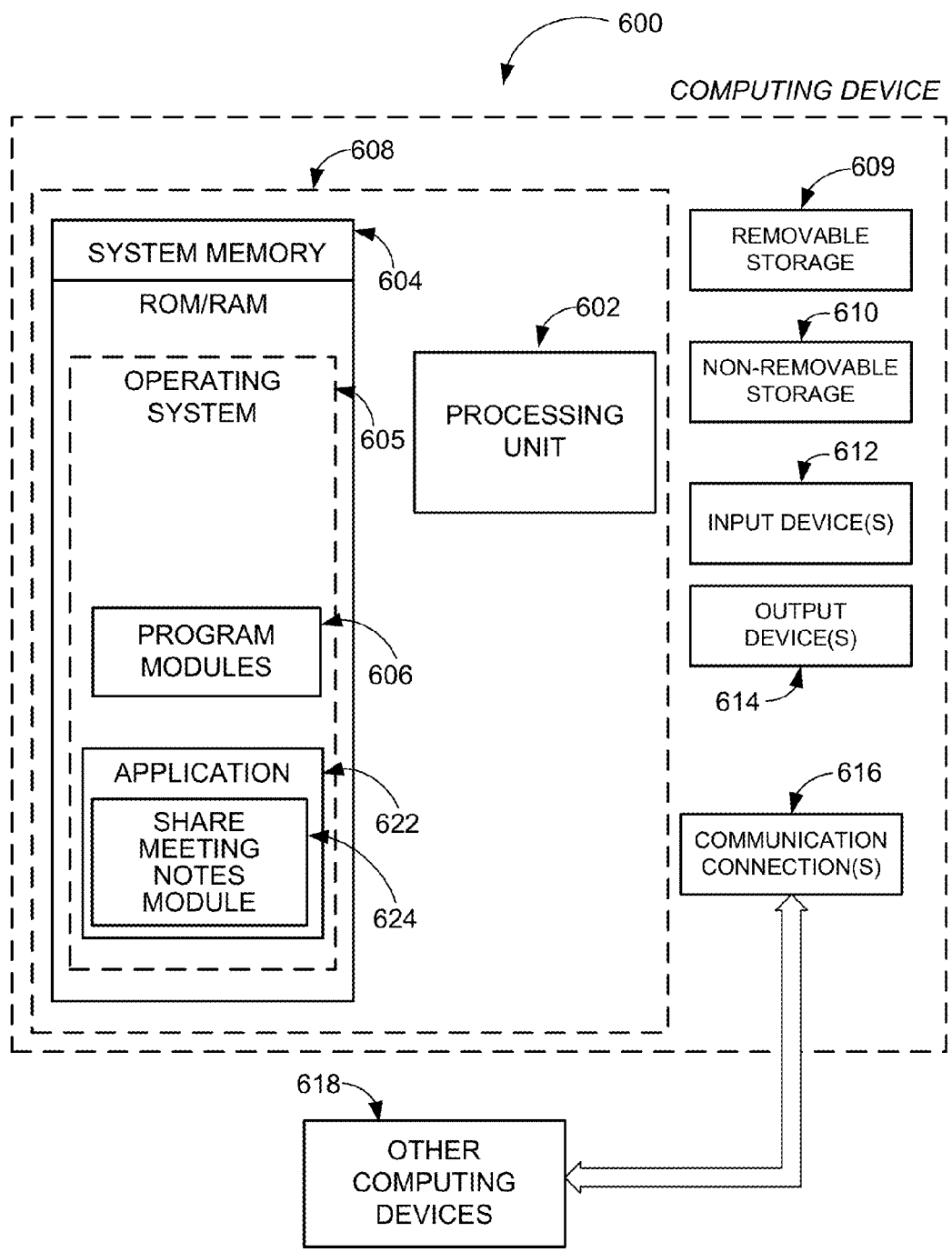
FIG. 6 is a block diagram of an example computing operating environment for note sharing, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing an application capable of sharing online meeting notes according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, application 622, and Share Meeting Notes module 624.

Through a user interface controlled by Share Meeting Notes module 624, application 622 may display information associated with shared meeting notes, enable a user to share meeting notes or create meeting notes for sharing, and so on. Application 622 and Share Meeting Notes module 624 may be separate applications or integrated modules of a hosted service. This basic configuration is illustrated in FIG. 6 by those components within dashed line 608.

Application 622 may be any application useful in conjunction with an online meeting, such as applications 104 and/or 116 in FIG. 1, for example, software used to conduct an online meeting, organize an online meeting, prepare materials for an online meeting, and/or present materials for an online meeting. In some examples, application 622 may be used to prepare or display text or other media for an online meeting, such as a word processing application, a note taking application, a slide presentation application, a spreadsheet application, a web browser application, an image or video application, or the like. In some examples, application 622 may be used to conduct an online meeting, such as a conferencing application, which may be web or server based. In some examples, application 622 may be used to organize or schedule an online meeting, such as a calendaring application or an email application. Sharing meeting notes is not limited to application 622. Application 622 may enable sharing meeting notes using data from another application or device, or controlling another application or device to share meeting notes.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
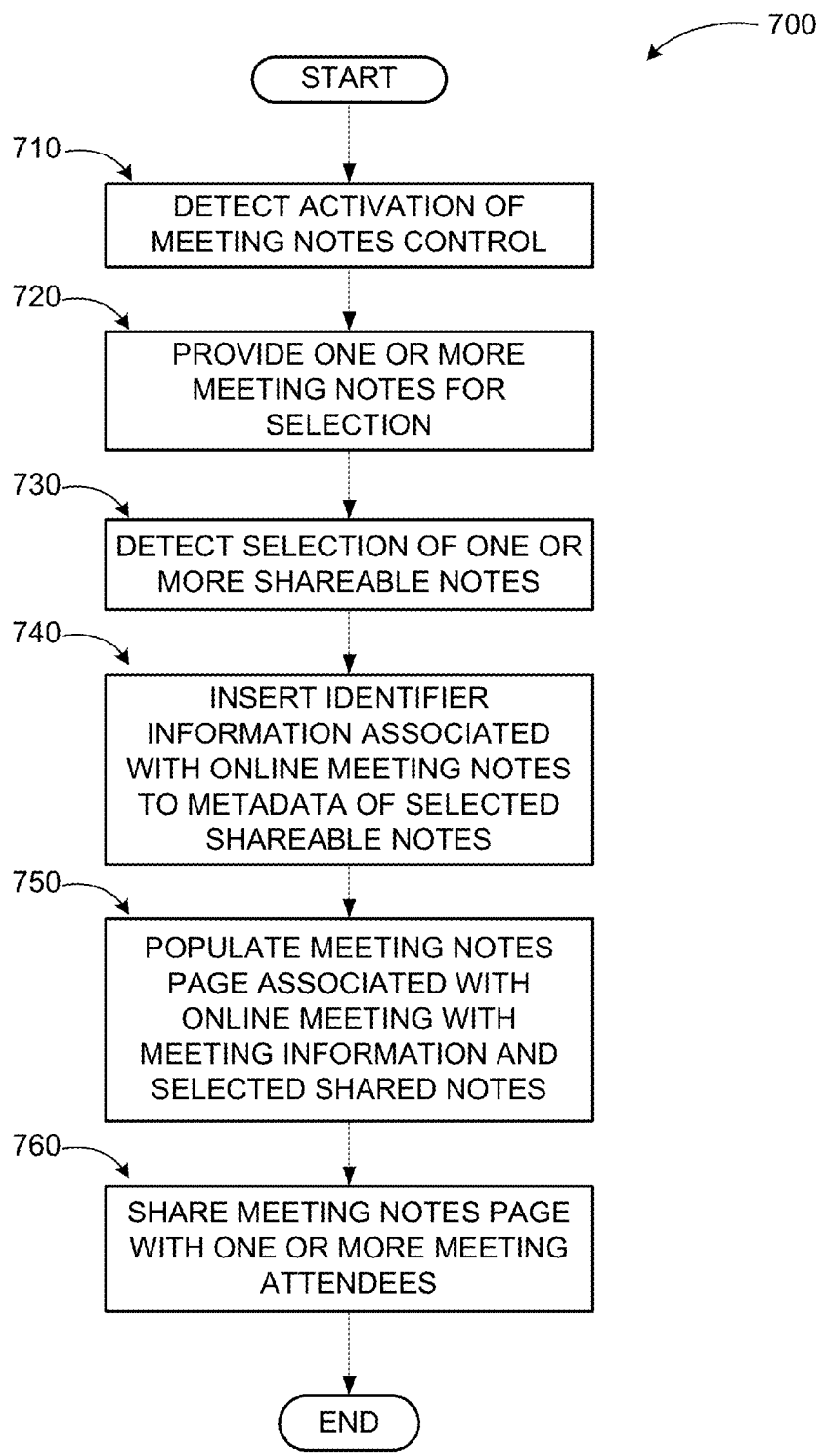
FIG. 7 illustrates a logic flow diagram for a process of sharing notes according to embodiments.

FIG. 7 illustrates a logic flow diagram for process 700 of sharing online meeting notes. Process 700 may be implemented on a server or other computing device.

Process 700 may begin with operation 710, which includes detecting activation of a meeting notes control. In various examples, such a meeting notes control may be provided within an online meeting application, a note taking application, a word processing application, a presentation application, a calendar application, a communication application, or a spreadsheet application. See, for example, applications 104, 116, or 622 as described for FIG. 1 and FIG. 6. In some examples, the online meeting application may also provide a link to the shared meeting notes through an invitation for the online meeting.

At operation 720, one or more notes may be provided to a user for selection. Notes for selection may include, for example, existing shared notes, existing notes not currently shared, an option to modify an existing note, an option to create a new note, to remove existing notes, an option to search for a note for sharing, or the like. Operation 730 may include detecting selection of one or more shareable notes, e.g., as selected by a user. Operation 740 may include inserting identifier information associated with the online meeting to data associated with the selected shareable notes. Such identifier information may include a unique identifier number, code, name, or the like.

At operation 750, a meeting notes page associated with the online meeting may be populated with meeting information and the selected shareable notes. Such meeting information may include, for example, a list of anticipated meeting attendees, a list of current meeting attendees, a date and time of the online meeting, one or more locations and/or servers of the online meeting, a meeting title, a list of one or more shareable meeting notes, and/or a list of meeting content. Such meeting information may also include the meeting identifier information, information on the various users and their roles and permissions; and the like. At operation 760, the meeting notes page may be shared with one or more meeting attendees during the online meeting rendering the selected shareable notes available to the meeting attendees. The selected notes may be shared before the online meeting, during the online meeting, or after the online meeting.

Figure 8:
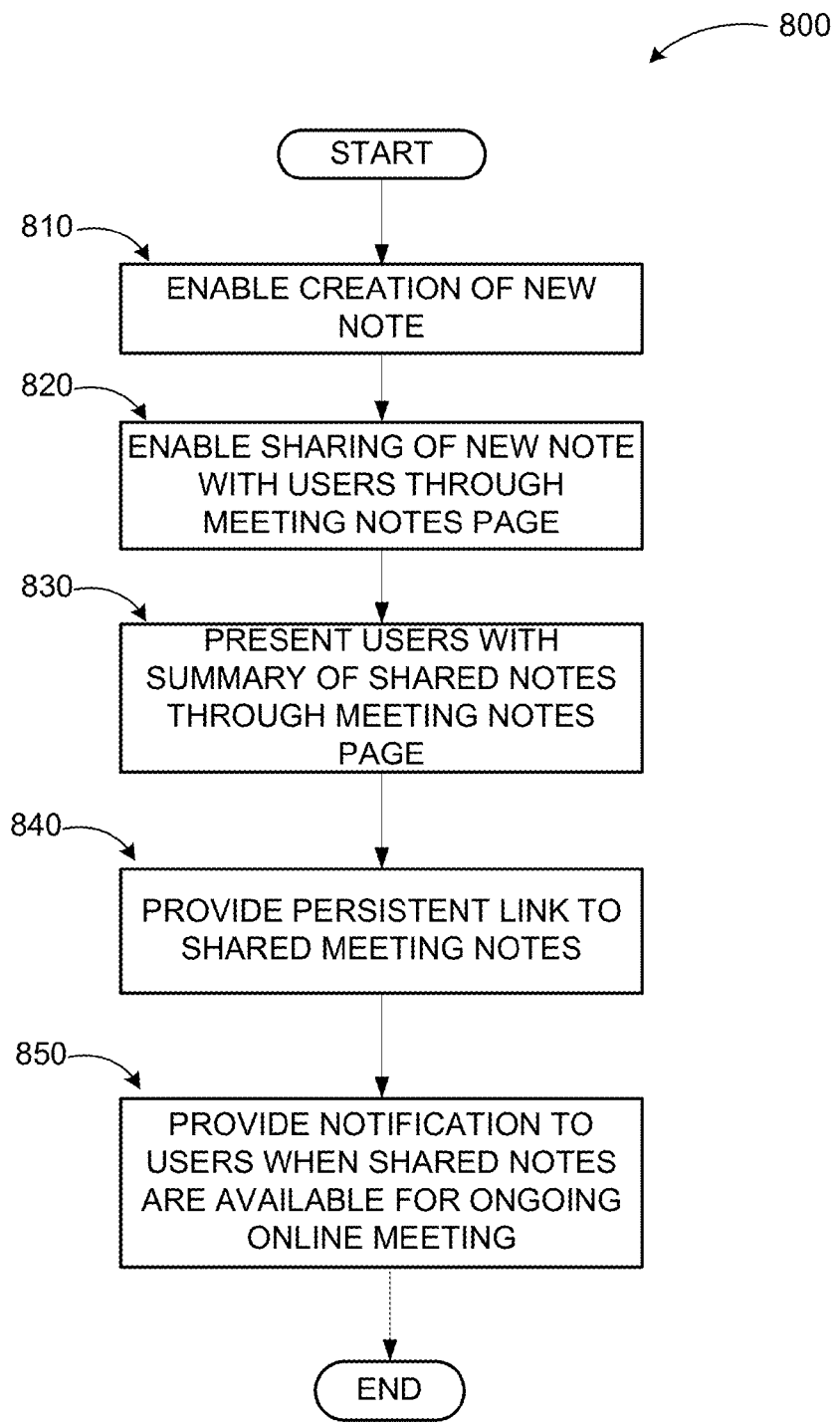
FIG. 8 illustrates further examples of operations which may be included in a process of sharing notes according to embodiments.

FIG. 8 illustrates further examples of operations which may be included in a process of sharing notes according to embodiments. In some examples, process 800 may include an operation 810, where a user is enabled to create a new note. At operation 820, the user may be enabled to share the new note with the meeting attendees through the meeting notes page. At operation 830, the system may present the meeting attendees with a summary view of the shared notes through the meeting notes page. In some examples, a persistent link to the shared meeting notes may be provided at operation 840 through a record of the online meeting. At operation 850, a notification may be provided to the meeting attendees when shareable notes are available with an ongoing online meeting.

The operations included in process 700 and 800 are for illustration purposes. Sharing of online meeting notes may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed in a computing device to facilitate note sharing in an online meeting, the method comprising:
 upon detecting activation of a meeting notes control, providing, in a separate meeting notes page that shows currently shared notes, one or more notes for selection, wherein the one or more notes for selection include at least one from a set of: existing shared notes, existing notes not currently shared, an option to modify an existing note, an option to create a new note, an option to remove existing notes, and an option to search for a note for sharing;
 detecting selection of one or more shareable notes;
 inserting identifier information associated with the online meeting to data associated with the selected shareable notes, wherein the identifier information includes one or more of: a unique identifier number, a code, and a name;
 populating the meeting notes page associated with the online meeting with meeting information and the selected shareable notes;
 adding metadata with information about the selected shareable notes to the meeting notes page and to a meeting invitation;
 adding the online meeting including the metadata about the selected shareable notes to a calendar as a calendar item, wherein the calendar item displays a control to permit a user to access, share, and create the meeting notes;
 sharing the meeting notes page with one or more meeting attendees during the online meeting rendering the selected shareable notes available to the meeting attendees; and
 enabling invitees of the online meeting to add invitee-added notes to the online meeting to be shared through a lookup table, wherein an owner of the online meeting is enabled to approve invitee-added notes prior to updating the online meeting to reflect the invitee-added notes.

2. The method of claim 1, further comprising:
 enabling sharing of the new note with the meeting attendees through the meeting notes page.

3. The method of claim 1, wherein the meeting information includes one or more of: a list of anticipated meeting attendees, a list of current meeting attendees, a date and time of the online meeting, one or more locations of the online meeting, a meeting title, a list of one or more shareable meeting notes, and a list of meeting content.

4. The method of claim 1, further comprising sharing the selected notes at one or more of: before the online meeting, during the online meeting, and after the online meeting.

5. The method of claim 1, further comprising providing the meeting notes control within one of: an online meeting application, a note taking application, a word processing application, a presentation application, a calendar application, a communication application, and a spreadsheet application.

6. The method of claim 1, further comprising one or more of:
 providing a persistent link to the shared meeting notes through a record of the online meeting within one of: an online meeting application and a calendar application;
 providing a notification to the meeting attendees when shareable notes are available for an ongoing online meeting; and
 enabling the meeting attendees to view the shared notes through the meeting notes page.

7. The method of claim 1, further comprising advertising the invitee-added notes to all invitees through one of a communication application and a scheduling application.

8. The method of claim 1, further comprising:
 enabling the invitee-added notes to be auto-approved; and
 updating a meeting invitation to reflect the invitee-added notes.

9. The method of claim 1, further comprising enabling the meeting attendees to view the shared notes through one of: a web browser, a note taking application, a word processing application, a presentation application, a calendar application, a communication application, and a spreadsheet application, wherein the meeting notes page is presented through one of: a separate user interface and an integrated user interface associated with the online meeting.

10. A server to facilitate an online meeting with note sharing, the server comprising:
 a memory;
 a processor coupled to the memory, the processor executing an online meeting application, wherein the online meeting application is configured to:
  provide a meeting notes control enabling sharing notes through a user interface controlled by a share meeting notes module;
  upon detecting activation of the meeting notes control, enable one of: selection among available notes to share and create a new note to employ the share meeting notes module and display a list of meetings which a user is currently joined and an option to join or start a new meeting;

insert identifier information associated with the online meeting to data associated with the meeting notes for sharing, wherein the identifier information includes more than one of: a unique identifier number, a code, and a name;

maintain the identifier information associated with the online meeting in a lookup table accessible to any user, and enable any user to look up a meeting based on the identifier information to a selected meeting;

populate a meeting notes page associated with the online meeting with the notes for sharing and meeting information, the meeting information comprising at least one from a set of: a list of anticipated meeting attendees, a list of current meeting attendees, a date and time of the online meeting, one or more locations of the online meeting, a meeting title, a list of the selected or created notes, and a list of meeting content;

provide an indicator on the meeting notes page to indicate that notes have been shared with the online meeting and to indicate how many shared notes are available;

enable selection of the indicator to directly open the note for sharing;

share the meeting notes page with one or more meeting attendees during the online meeting rendering the notes for sharing available to the meeting attendees through the user interface controlled by the share meeting notes module; and enable invitees of the online meeting to add invitee-added notes to the online meeting to be shared through the lookup table, wherein an owner of the online meeting is enabled to approve invitee-added notes prior to updating the online meeting to reflect the invitee-added notes.

11. The server of claim 10, wherein the online meeting application is further configured to enable selection among available notes for sharing and creation of a new note for sharing through one of: the user interface associated with the online meeting application, a scheduling application, a note taking application, a word processing application, a presentation application, a communication application, and a spreadsheet application.

12. The server of claim 10, wherein the online meeting application is further configured to:
provide a link to the shared meeting notes through an invitation for the online meeting;
one of update and remove the link in response to one of the selection and a creation of additional notes during the online meeting; and
persist the link through a record of the online meeting within a scheduling application such that the shared meeting notes are available to the meeting attendees after the online meeting.

13. The server of claim 10, wherein the online meeting application is further configured to:
enable definition of permission attributes associated with the shared meeting notes to the meeting attendees; and
enable the meeting attendees to access the shared meeting notes based on their permission attributes.

14. The server of claim 10, wherein the online meeting application is further configured to:
automatically determine permission attributes of the meeting attendees associated with the shared meeting notes based on their online meeting roles; and
enable the meeting attendees to access the shared meeting notes based on their permission attributes.

15. The server of claim 14, wherein the meeting roles includes one of a presenter and a viewer.

16. A computer-readable memory device with instructions stored thereon to share notes in an online meeting, the instructions comprising:
enabling creation of one or more notes for sharing in the online meeting;
enabling selection among available notes for sharing in the online meeting
through a meeting notes control within a user interface associated with one of: a scheduling application, a note taking application, a word processing application, a presentation application, a communication application, and a spreadsheet application, wherein the notes for selection are provided in a separate meeting notes page that shows currently shared notes, and include at least one from a set of: existing shared notes, existing notes not currently shared, an option to modify an existing note, an option to create a new note, an option to remove existing notes, and an option to search for a note for sharing;
displaying a list of meetings which a user is currently joined and an option to join or start a new meeting;
detecting activation of the meeting notes control and selection of one or more notes to be shared in the online meeting;
inserting identifier information associated with the online meeting to data associated with the notes to be shared;
maintaining the identifier information associated with the online meeting in a lookup table accessible to any user, and enable any user to look up a meeting based on the identifier information to a selected meeting;
populating a meeting notes page associated with the online meeting with the notes to be shared and meeting information comprising at least one from a set of: a list of anticipated meeting attendees, a list of current meeting attendees, a date and time of the online meeting, one or more locations of the online meeting, a meeting title, a list of the notes to be shared, and a list of meeting content;
adding the online meeting including metadata about the selected one or more notes to a calendar as a calendar item, wherein the calendar item displays a control to permit a user to access, share, and create meeting notes;
sharing the meeting notes page with one or more meeting attendees during the online meeting, rendering the notes to be shared available to the meeting attendees;
displaying an indicator on the meeting notes page to indicate that notes have been shared with the online meeting and to indicate how many shared notes are available; and
enabling invitees of the online meeting to add invitee-added notes to the online meeting to be shared through the lookup table, wherein an owner of the online meeting is enabled to approve invitee-added notes prior to updating the online meeting to reflect the invitee-added notes.

17. The computer-readable memory device of claim 16, wherein the instructions further comprise:
presenting the meeting attendees with a summary view of the shared notes through the meeting notes page.

18. The computer-readable memory device of claim 16, wherein the instructions further comprise:
automatically determining permission attributes of the meeting attendees associated with the shared notes based on their online meeting roles; and
enabling the meeting attendees to edit the shared notes based on their permission attributes.

19. The computer-readable memory device of claim 16, wherein the instructions further comprise:
- detecting at least one presenter and at least one viewer associated with the online meeting;
- enabling the at least one presenter to edit the shared notes; and
- enabling the at least one viewer to view the shared notes.

\* \* \* \* \*